United States Patent
Iyengar et al.

(10) Patent No.: US 9,966,067 B2
(45) Date of Patent: May 8, 2018

(54) AUDIO NOISE ESTIMATION AND AUDIO NOISE REDUCTION USING MULTIPLE MICROPHONES

(71) Applicant: Apple Inc., Cupertino, CA (US)

(72) Inventors: Vasu Iyengar, Pleasanton, CA (US); Sorin V. Dusan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 13/911,915

(22) Filed: Jun. 6, 2013

(65) Prior Publication Data

US 2013/0332157 A1 Dec. 12, 2013

Related U.S. Application Data

(60) Provisional application No. 61/657,655, filed on Jun. 8, 2012, provisional application No. 61/700,178, filed on Sep. 12, 2012.

(51) Int. Cl.
| | |
|---|---|
| *G10L 21/00* | (2013.01) |
| *G10L 15/20* | (2006.01) |
| *G10L 21/0232* | (2013.01) |
| *G10L 21/0224* | (2013.01) |
| *G10L 25/78* | (2013.01) |
| *G10L 21/0216* | (2013.01) |

(52) U.S. Cl.
CPC .......... *G10L 15/20* (2013.01); *G10L 21/0232* (2013.01); *G10L 21/0224* (2013.01); *G10L 2021/02165* (2013.01); *G10L 2025/783* (2013.01)

(58) Field of Classification Search
CPC .......................... G10L 21/0224; G10L 21/0232

USPC .................................................. 704/226, 233
See application file for complete search history.

(56) References Cited

U.S. PATENT DOCUMENTS

| | | | |
|---|---|---|---|
| 7,761,106 B2 | 7/2010 | Konchitsky | |
| 8,019,091 B2 * | 9/2011 | Burnett | H04R 1/46 381/71.8 |
| 8,068,619 B2 | 11/2011 | Zhang et al. | |
| 8,521,530 B1 * | 8/2013 | Every | H04M 9/08 381/66 |
| 9,215,527 B1 | 12/2015 | Saric et al. | |
| 2007/0237339 A1 | 10/2007 | Konchitsky | |
| 2007/0274552 A1 | 11/2007 | Konchitsky et al. | |
| 2009/0190769 A1 | 7/2009 | Wang et al. | |

(Continued)

OTHER PUBLICATIONS

Non-Final Office Action (dated Jan. 30, 2015), U.S. Appl. No. 13/715,422, filed Dec. 14, 2012, First Named Inventor: Sorin V. Dusan, (16 pages).

(Continued)

*Primary Examiner* — Forrest F Tzeng
(74) *Attorney, Agent, or Firm* — Womble Bond Dickinson (US) LLP

(57) ABSTRACT

Digital signal processing techniques for automatically reducing audible noise from a sound recording that contains speech. A noise suppression system uses two types of noise estimators, including a more aggressive one and less aggressive one. Decisions are made on how to select or combine their outputs into a usable noise estimate in a different speech and noise conditions. A 2-channel noise estimator is described. Other embodiments are also described and claimed.

16 Claims, 8 Drawing Sheets

(56) References Cited

U.S. PATENT DOCUMENTS

| | | | |
|---|---|---|---|
| 2009/0220107 A1* | 9/2009 | Every | G10L 21/0208 381/94.7 |
| 2010/0100374 A1* | 4/2010 | Park | G10L 21/0208 704/226 |
| 2011/0106533 A1* | 5/2011 | Yu | G10L 25/78 704/233 |
| 2011/0317848 A1* | 12/2011 | Ivanov | H04R 3/005 381/94.2 |
| 2012/0310640 A1 | 12/2012 | Kwatra et al. | |
| 2013/0054231 A1* | 2/2013 | Jeub | H04R 3/005 704/226 |
| 2014/0126745 A1 | 5/2014 | Dickins et al. | |
| 2015/0110284 A1 | 4/2015 | Niemisto et al. | |

OTHER PUBLICATIONS

U.S. Notice of Allowance, dated Sep. 29, 2016, U.S. Appl. No. 14/170,136.

\* cited by examiner

AUDIO NOISE ESTIMATION AND AUDIO NOISE REDUCTION USING MULTIPLE MICROPHONES

RELATED MATTERS

This non-provisional application claims the benefit of the earlier filing dates of provisional application No. 61/657,655 filed Jun. 8, 2012, and provisional application No. 61/700,178 filed Sep. 12, 2012.

An embodiment of the invention is related to digital signal processing techniques for automatically reducing audible noise from a sound recording that contains speech. Other embodiments are also described.

BACKGROUND

Mobile phones enable their users to conduct conversations in many different acoustic environments. Some of these are relatively quiet while others are quite noisy. There may be high background or ambient noise levels, for instance, on a busy street or near an airport or train station. To improve intelligibility of the speech of the near-end user as heard by the far-end user, an audio signal processing technique known as ambient noise suppression can be implemented in the mobile phone. During a mobile phone call, the ambient noise suppressor operates upon an uplink signal that contains speech of the near-end user and that is transmitted by the mobile phone to the far-end user's device during the call, to clean up or reduce the amount of the background noise that has been picked up by the primary or talker microphone of the mobile phone. There are various known techniques for implementing the ambient noise suppressor. For example, using a second microphone that is positioned and oriented to pickup primarily the ambient sound, rather than the near-end user's speech, the ambient sound signal is electronically subtracted from the talker signal and the result becomes the uplink. In another technique, the talker signal passes through an attenuator that is controlled by a voice activity detector, so that the talker signal is attenuated during time intervals of no speech, but not in intervals that contain speech. A challenge lies in the latter technique, as to how to determine when the attenuation should be applied and when it should not, particularly in the case where the sound being recorded is that of a user on a mobile phone call. In that use case, intervals of primarily speech (when the user is talking) and primarily noise (when the user is not talking) are for the most part randomly distributed, especially when the noise is not stationary (e.g., a car or a train passes by).

SUMMARY

An electronic system for audio noise processing and for noise reduction is described that uses multiple microphones. A first noise estimator processes a first audio signal from a first one of the microphones, and generates a first noise estimate. A second noise estimator processes the first audio signal, and a second audio signal from a second one of the microphones, in parallel with the first noise estimator, to generate a second noise estimate. A comparator compares the first noise estimate and the second noise estimate with a threshold. A combiner-selector receives the first and second noise estimates, and generates an output noise estimate using the first and second noise estimates, based on the comparison. An attenuator attenuates the first audio signal in accordance with the output noise estimate.

In one embodiment, a second noise estimator is described, which is more aggressive than the first noise estimator. The combiner-selector is configured to automatically select between those two noise estimators, or automatically weight and combine the outputs of the two estimators, so as to improve the accuracy of its output noise estimate in different speech and ambient noise scenarios. This helps improve the effectiveness of the attenuator in better suppressing noise in the first audio signal, but without introducing audible artifacts into the attenuated output.

In another embodiment, the comparator may be configured with a threshold (e.g., at least 10 dB, or between 15-22 dB, or about 18 dB) that allows some transient noise to be estimated by the more aggressive (second) noise estimator, but when the more aggressive noise estimator goes too far, relative to the less aggressive estimator, its estimate is de-emphasized or even not selected, in favor of the estimate from the less aggressive estimator. This helps avoid too much attenuation by the noise suppressor, in situations similar to when the user of a mobile phone, while in a quiet room or in a car, is close to a window or a wall, which may then cause reflections of the user's voice to be erroneously interpreted as noise by the more aggressive estimator.

In one embodiment, a 2-channel noise estimator is described that, in the presence of speech (which may have been detected from a first channel for instance), computes a quantity that is proportional to a difference between the two channel signals (which can be used as a voice activity detector itself), and is scaled by a factor that is approximated by a ratio of the transfer functions of the two channels. The scaled quantity may be deemed an estimate of the speech picked up by the second channel. The scaled quantity is then subtracted from the second channel signal, and this result is used as the output noise estimate, but only if it is higher than a noise floor (being for example a prior stationary noise estimate generated by a 1-channel estimator).

In another embodiment, a microphone occlusion detector is added to the noise reduction system, so that the combiner-selector generates its output noise estimate based on the occlusion signal. In particular, the occlusion detection is used to select a 1-channel noise estimate, instead of a 2-channel noise estimate, when an occlusion signal indicates that a second microphone is occluded. This helps maintain proper noise suppression even when a user's finger has inadvertently occluded the second microphone, during speech activity, and during no speech but high background noise levels.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
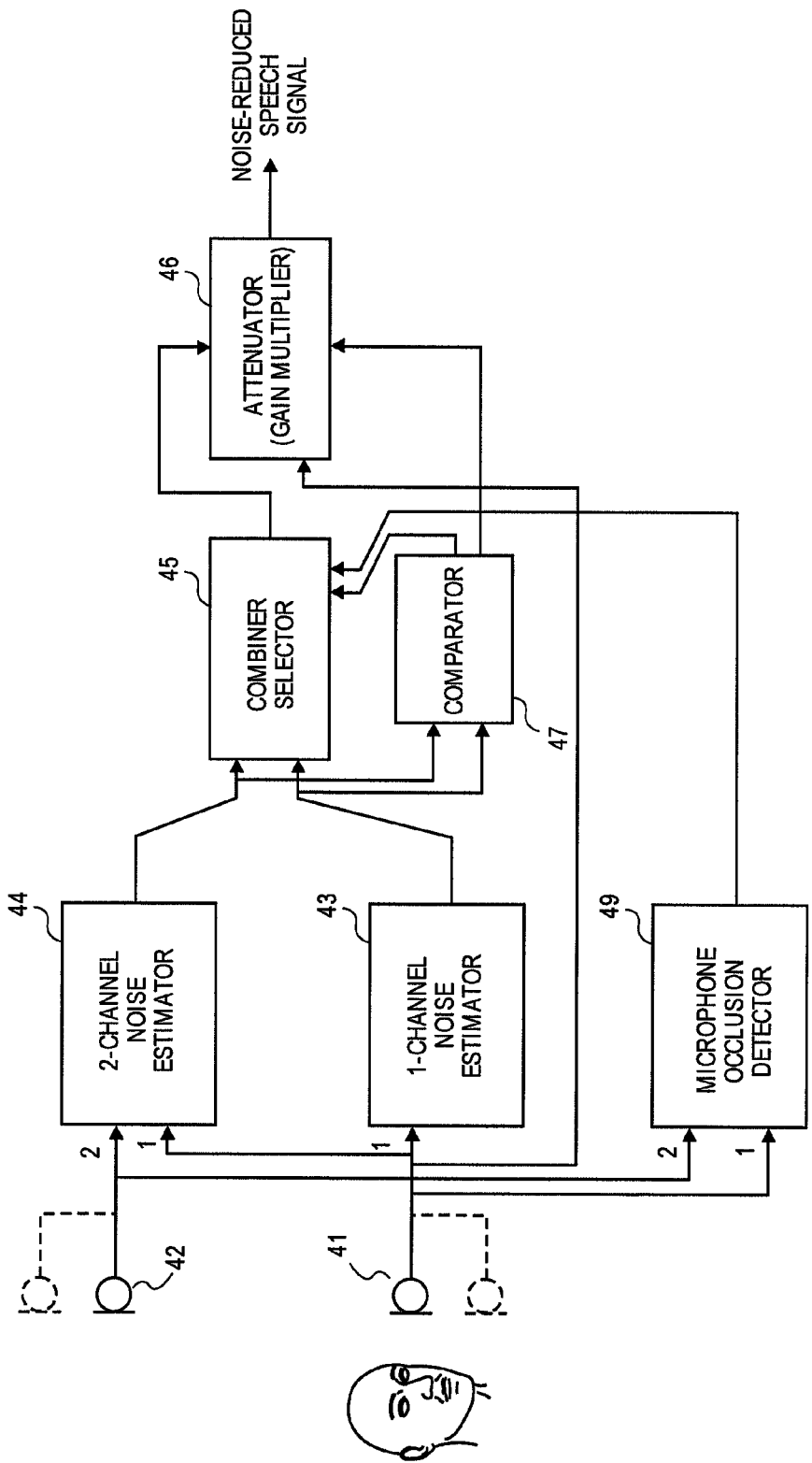
FIG. 1 is a block diagram of an electronic system for audio noise processing and noise reduction using multiple microphones.

FIG. 1 is a block diagram of an electronic system for audio noise processing and noise reduction using multiple microphones. In this example, there are two microphones 41, 42. The microphone 41 may be a primary microphone or talker microphone, which is closer to the desired sound source than the microphone 42. The latter may be referred to as a secondary microphone, and is in most instances located farther away from the desired sound source than microphone 41. Examples of such microphones may be found in a variety of different user audio devices. An example is the mobile phone—see FIG. 7. Both microphones 41, 42 are expected to pick up some of the ambient or background acoustic noise that surrounds the desired sound source albeit the microphone 41 is expected to pick up a stronger version of the desired sound. In one case, the desired sound source is the mouth of a person who is talking thereby producing a speech or talker signal, which is also corrupted by the ambient acoustic noise.

There are two audio or recorded sound channels shown, for use by various component blocks of the noise reduction (also referred to as noise suppression) system. Each of these channels carries the audio signal from a respective one of the two microphones 41, 42. It should be recognized however that a single recorded sound channel could also be obtained by combining the signals of multiple microphones, such as via beamforming. This alternative is depicted in the figure, by the additional microphones and their connections, which are in dotted lines. It should also be noted that in the preferred approach, all of the processing depicted in FIG. 1 is performed in the digital domain, based on the audio signals in the two channels being discrete time sequences. Each sequence audio data may be arranged as a series of frames, where all of the frames in a given sequence may or may not have the same number of samples.

A pair of noise estimators 43, 44 operate in parallel to generate their respective noise estimates, by processing the two audio signals from the first channel and the second channel. The noise estimator 43 is also referred to as noise estimator B, whereas the noise estimator 44 can be referred to as noise estimator A. In one instance, the estimator 44 is more aggressive than the estimator 43 in that it is more likely to generate a greater noise estimate, while the microphones are picking up a near-end-user's speech and background acoustic noise during a mobile phone call.

In one embodiment, for stationary noise, such as car noise, the two estimators 44, 43 should provide for the most part similar estimates, except that in some instances there may be more spectral detail provided by the estimator 44 which may be due to a better VAD being used as described further below, and the ability to estimate noise even during speech activity. On the other hand, when there are significant transients in the noise, such as babble and road noise, the estimator 44 can be more aggressive, since noise transients are estimated more accurately in that case. With estimator 43, some transients could be interpreted as speech, thereby excluding them (erroneously) from the noise estimate.

In another embodiment, the noise estimator 43 is primarily a stationary noise estimator, whereas the noise estimator 44 can do both stationary and non-stationary noise estimation.

In yet another embodiment, estimator 44 may be deemed more accurate in estimating non-stationary noises than estimator 43 (which may essentially be a stationary noise estimator). Estimator 44 might also misidentify more speech as noise, if there is not a significant difference in voice power between a primarily voice signal at the microphone 41 and a primarily noise signal at the microphone 42. This can happen, for example, if the talker's mouth is located the same distance from each of the microphones 42, 41. In a preferred realization of the invention, the sound pressure level (SPL) of the noise source is also a factor in determining whether estimator 44 is more aggressive than estimator 43—above a certain (very loud) level, estimator 44 can become less aggressive at estimating noise than estimator 43. In another instance, the estimator 44 is referred to as a 2-channel or 2-mic estimator, while estimator B is a 1-channel or 1-mic estimator. The references 1-mic and 2-mic here refer to the number of input audio channels, not the actual number of microphones used to generate the channel signals.

The noise estimators 44, 43 operate in parallel, where the term "parallel" here means that the sampling intervals or frames over which the audio signals are processed have to, for the most part, overlap in terms of absolute time. In one embodiment, the noise estimate produced by each estimator 44, 43 is a respective noise estimate vector, where this vector has several spectral noise estimate components, each being a value associated with a different audio frequency bin. This is based on a frequency domain representation of the discrete time audio signal, within a given time interval or frame. See FIG. 2, which shows an example discrete time sequence with a frame highlighted therein, a frequency domain representation of that frame which may be obtained by, for example, a discrete fourier transform operation or by wavelet filter banks, and a series of voice activity decisions that are provided on a per frequency bin basis.

A combiner-selector 45 receives the two noise estimates and generates a single output noise estimate, based on a comparison, provided by a comparator 47, between the two noise estimates. The comparator 47 allows the combiner-selector 45 to properly estimate noise transients within a bound from the 1-channel estimator 43. In one instance, the combiner-selector 45 combines, for example as a linear combination, its two input noise estimates to generate its output noise estimate. However, in other instances, the combiner-selector 45 may select the input noise estimate from estimator 44, but not the one from estimator 43, and vice-versa.

The noise estimator 43 may be a conventional single-channel noise estimator that is typically used with single-channel noise suppression systems. In such a system, the attenuation that is applied in the hope of suppressing noise (and not speech) may be viewed as a time varying filter that applies a time varying gain (attenuation) vector, to the single, noisy input channel, in the frequency domain. Typically, such a gain vector is based to a large extent on Wiener theory and is a function of the signal to noise ratio (SNR) estimate in each frequency bin. To achieve noise suppression, bins with low SNR are attenuated while those with high SNR are passed through unaltered, according to a well know gain versus SNR curve. Such a technique tends to work well for stationary noise such as fan noise, far field crowd noise, or other relatively uniform acoustic disturbance. Non-stationary and transient noises, however, pose a significant challenge, which may be better addressed by the noise estimation and reduction system depicted in FIG. 1 which also includes the estimator 44, which may be a more aggressive 2-channel estimator. In general, the embodiments of the invention described here as a whole may aim to address the challenge of obtaining better noise estimates, both during noise only conditions and noise+speech conditions, as well as for noises that include significant transients.

Still referring to FIG. 1, the output noise estimate from the combiner-selector 45 is used by an attenuator (gain multiplier) 46, to attenuate the audio signal from microphone 41. The action of the attenuator 46 may be in accordance with a conventional gain versus SNR curve, where typically the attenuation is greater when the noise estimate is greater. The attenuation may be applied in the frequency domain, on a per frequency bin basis, and in accordance with a per frequency bin noise estimate which is provided by the combiner-selector 45.

Each of the estimators 43, 44, and therefore the combiner-selector 45, may update its respective noise estimate vector in every frame, based on the audio data in every frame, and on a per frequency bin basis. The spectral components within the noise estimate vector may refer to magnitude, energy, power, energy spectral density, or power spectral density, in a single frequency bin.

In one embodiment, the output noise estimate of the combiner-selector 45 is a combination of the first and second noise estimates, or is a selection between one of them, that favors the more aggressive estimator (second noise estimate). But this behavior stops when the second noise estimate (estimator 44) becomes greater than the first noise estimate (estimator 43) by a predetermined threshold or bound (configured into the comparator 47), in which case the contribution of the second noise estimate is lessened or it is no longer selected. This limit on the use of the 2-channel noise estimate helps avoid the application of too much attenuation by the noise suppressor (see FIG. 1), in situations similar to when the user of a mobile phone, while in a quiet room or in a car, is close to a window or a wall, which may then cause reflections of the user's voice to be erroneously interpreted as noise by the more aggressive estimator. Another similar situation is when the user audio device is being held in an orientation that causes the voice to be erroneously interpreted as noise.

Figure 5:
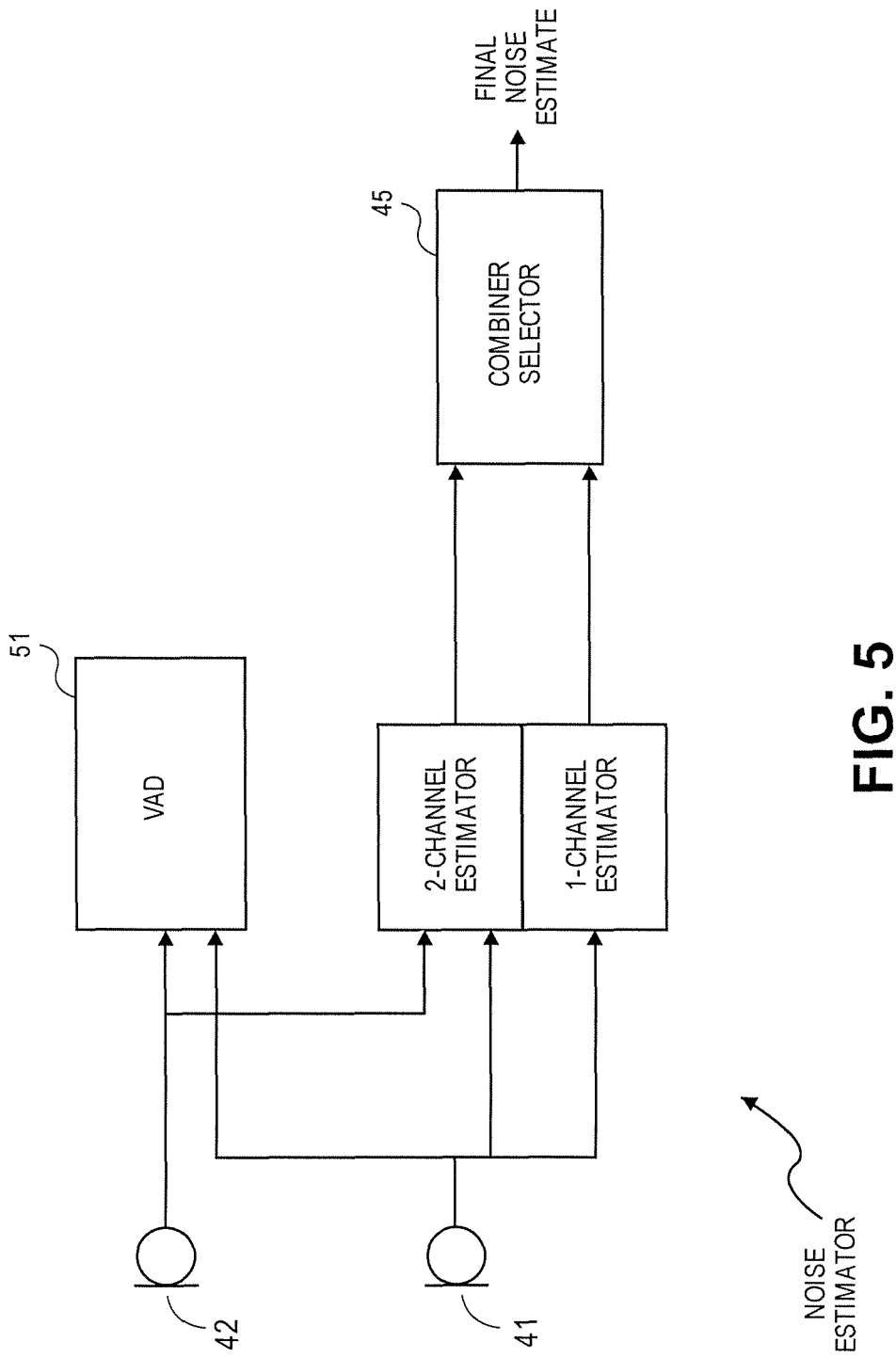
FIG. 5 is a block diagram of another 2-channel noise estimator.

In another embodiment, referring also to FIG. 5, in the case where there is essentially no near-end user voice activity being detected by the VAD 51, the 2-channel noise estimate is not constrained (e.g., in any of the frequency bins). This allows the combiner/selector 45 full use of the second noise estimate, which in turn allows greater transient noise reduction (see FIG. 1), where there is essentially no near-end speech. However, in the case where there is near-end user voice activity being detected, the above-described limit on usage of the second noise estimate is imposed, so as to protect against voice coloration in non-center or unusual cases (e.g., such as those described above, namely reflections from a nearby surface and upside down or "out" orientations of the mobile device).

The following sections introduce a problem that is to be solved here by the noise suppression system of FIG. 1, examine solutions involving a particular 2-channel noise estimator, and refer to relevant simulation or experimental data in order to justify various embodiments of the invention that may yield promising results in terms of improved noise suppression with fewer artifacts, using actual sound recordings. It has been discovered that if the noise estimate is accurate, then a suppression method that relies on an SNR estimate (computed using the noise estimate) gives acceptable results, even for non-stationary noise. Therefore, an approach taken here is to improve the SNR estimate, using information from two microphone channels. This depends on improving the noise estimate during both noise only intervals, as well as speech plus noise intervals.

According to an embodiment of the invention, a 2-channel noise estimator (which may be the noise estimator 44 in FIG. 1) may compute a noise estimate as its output, which may estimate the noise in the signal from the first channel, using the following formula $$V_2(k) = X_2(k) - \Delta X(k) \frac{1}{MR - 1} \quad (1)$$

$$MR = \frac{H_1(k)}{H_2(k)} \quad (2)$$

where $V_2(k)$ is the spectral component in frequency bin k of the noise as picked up by the second channel, $X2(k)$ is the spectral component of the audio signal from the second channel (at frequency bin k), $$\Delta X(k) = |X_1(k)| - |X_2(k)|$$

where $\Delta X(k)$ is the difference in spectral component k of the magnitudes, or in some cases the power or energy, of the two microphone signals $X_1$, and $X_2$, and $H_1(k)$ is the spectral component at frequency bin k of the transfer function of the first channel and $H_2(k)$ is the spectral component at frequency bin k of the transfer function of the second channel.

A further assumption is that far-field noises, both stationary and transient, are likely to be picked up almost equally by the first and second channels. Some assumptions and approximations are made in deriving the above equations. For example, the formula does not estimate the signal component at the desired sound source (e.g., the user's mouth), which may require an exact knowledge of the impulse responses of the two microphone channels and which may be quite difficult to estimate or predict in all uses cases, given the variability in how the microphones are positioned relative to the desired source, and also the presence of reverberation surrounding the user. Rather, the reverberation is ignored so that the speech signal as picked up by the first channel includes reverberation, and is in fact the signal to be estimated.

In equation (1) above, the quantity MR is affected by several factors. For example, in the case of a mobile phone, MR is affected by how the mobile phone is being held, whether the user is using a hat, whether the user is standing next to a wall or glass window, and whether the environment is outdoors or within a small room.

Some relevant observations about the terms in equation (1), that are based on simulated and experimental data, are as follows: taking the difference between the two microphone channel signals, namely ΔX—, may result in a relatively small amount of attenuation of the desired source (e.g., a speech or talker signal), while for stationary car noise and, in the case of a radio playing in the background in a car, taking the difference may result in a much larger amount of reduction in the noise level (e.g., on the order of about 20 dB or more). Thus, when a speech signal is present, ΔX may in essence be an estimate of the speech signal. This then implies that the second microphone channel output is a good approximation to the background noise as picked up by the first microphone channel, such that during speech activity, the signal at the second microphone channel or $X_2(k)$ is a close approximation to the noise component $V_1$ that is present in the signal from the first microphone channel.

As such, ΔX may be used to determine if speech activity by the talker is present—similar to a voice activity detector (VAD). A VAD decision can thus be implemented for each frequency bin, by comparing ΔX to a threshold. This implementation of a voice activity detector may be validated by considering the experimental data depicted in FIG. 3 where the VAD threshold in this example only is 8 dB. This data suggests that ΔX can indeed be used by itself as a VAD detector, e.g. to implement a VAD 51 as described below in connection with FIG. 2. Note that the VAD decision using ΔX may be deemed more robust then other techniques, since the SNR has been enhanced by about 20 dB in ΔX as reported earlier.

Figure 2:
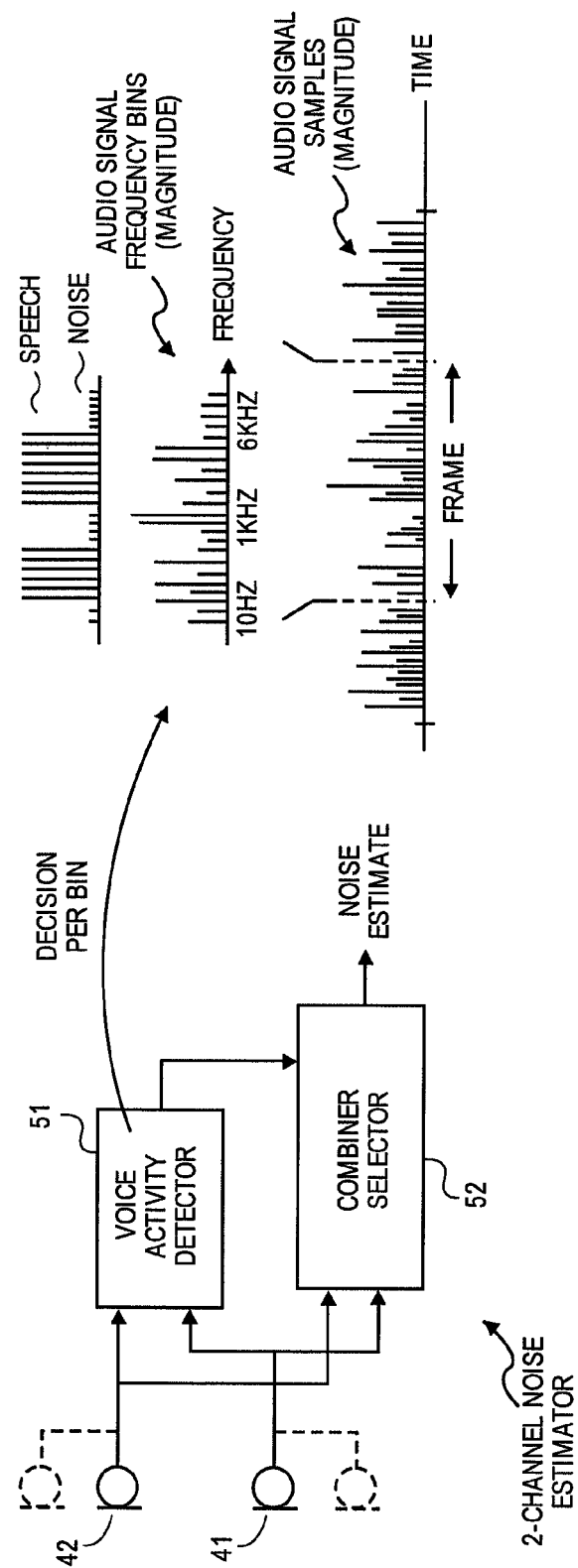
FIG. 2 is a block diagram of a 2-channel estimator.
Figure 3:
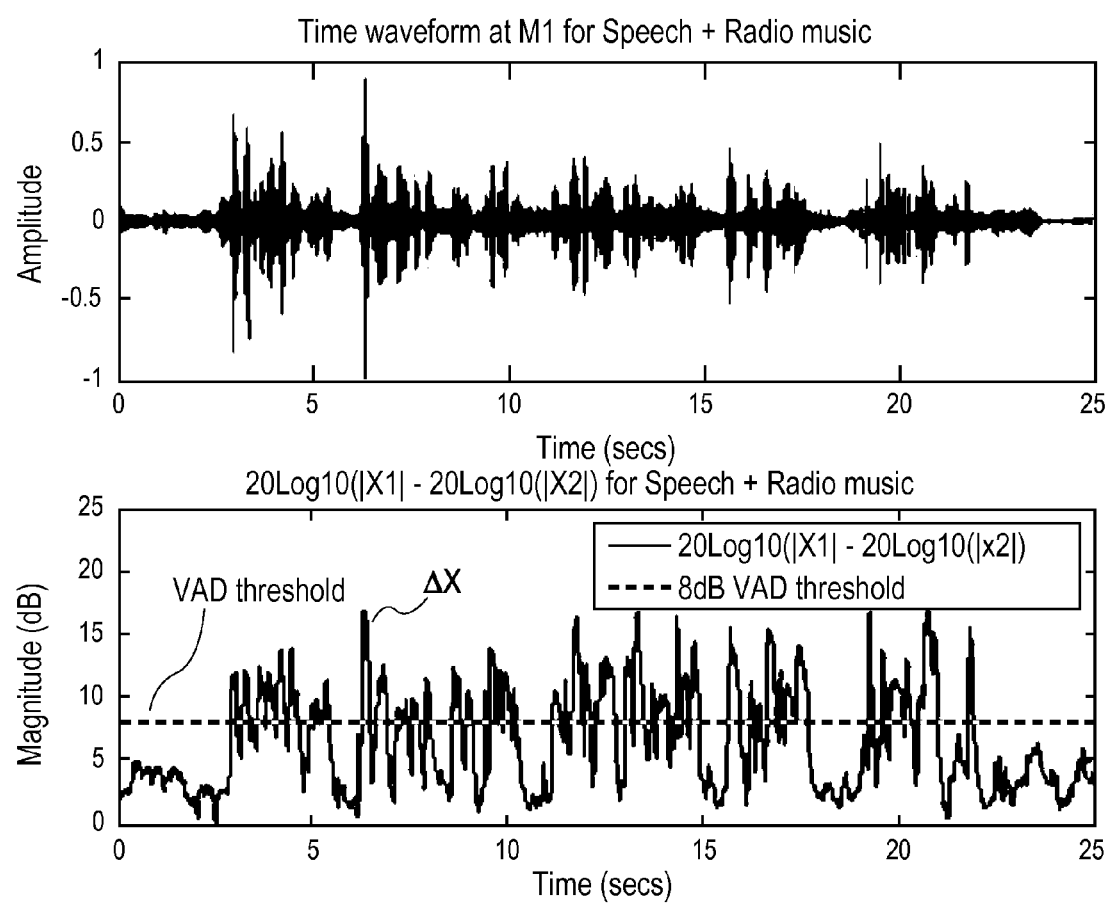
FIG. 3 shows a waveform for an example speech plus noise condition and a corresponding deltaX plot depicting a VAD function.

Referring to FIG. 2 now, this is a block diagram showing details of an example 2-channel noise estimator (estimator 44 in FIG. 1). The following algorithm may be used to implement a combiner-selector 52 in the 2-channel estimator, in conjunction with the VAD 51. Note that the latter may be implemented using ΔX (as described above).

Convert discrete time audio signals to frequency domain (e.g., using a FFT), and from there compute the following raw power spectra.

--- ps_pri = power spectrum of primary mic (mic1) signal.
ps_sec = power spectrum of secondary mic (mic2) signal.

---

The raw power spectra may be time and frequency smoothed.

---

Spri = Time and frequency smoothed spectrum of primary mic signal.
Ssec = Time and frequency smoothed spectrum of secondary mic.
beta = time constant for smoothing the noise estimate
beta_1 = 1 − beta
Threshold = T (indB)
  % 2-channel noise estimate
  % non-vectorized implementation initially
  for ii=1:N % loop over all frequency bins
    % check for voice activity using,
    if ( Spri(ii) > Ssec(ii)*Threshold )
      % Voice detect
      noise_sample = ps_sec(ii);

---continued else
      % Noise detect (Stationary or non-stationary)
      noise_sample = ps_pri(ii);
    end
    % Now filter
    noise(ii) = noise(ii)*beta_1 + noise_sample*beta;
  end

---

According to the above algorithm for the 2-channel noise estimator (estimator 44), if voice activity is present as determined by ΔX (which is in effect a comparison between the audio signals from the two microphone channels) then the combiner-selector 52 generates its noise estimate from the second audio signal, namely ps_sec, and not the first audio signal, namely ps_pri. Note that while in the above algorithm, the output noise estimate is smoothed, this is optional and may not be needed in some instances.

It should be understood that the second channel audio signal, namely ps_sec, contains primarily noise in this case, as well as reverberation components of the desired source signal, which may be the talker signal from the first channel. If there is no voice activity on the other hand, which may occur when the first channel; signal is sufficiently smaller than the second channel signal as per a threshold, then the combiner-selector 52 generates its noise estimate from the first audio signal, namely ps_pri, and not the second audio signal ps_sec. In both instances, the output noise estimate may be smoothed as indicated above by selecting the appropriate time constant beta.

The algorithm above for a dual channel noise estimator was experimentally tested as part of a noise suppressor, with several real world recordings, including different speed car noises and recordings of speech plus radio playing in a car. Even for the stationary car noise case, an improvement was heard over a noise suppression system that uses a 1-channel estimator, both in terms of voice quality and noise reduction. For the non-stationary radio music case, further reduction in the background noise (being music in this case) was achieved, in contrast to a single channel noise suppressor. In addition, even though slightly subjective, voice quality was also improved in that case, over the single-channel noise suppressor.

Several observations can be made here. First, regarding the smoothing across frequency bins, in one embodiment such smoothing may be performed across a number of adjacent bins, for example, three bins. In another embodiment however, which may prove more effective, the smoothing is performed across a fixed bandwidth rather than a fixed number of bins, regardless of the audio signal sampling rate and the time interval frame size that is being used. In addition, the smoothing time constant beta for the noise estimate during voice activity should be adjusted so as to improve performance. In addition, a further scaling factor for the noise estimate may be desirable, again during voice activity. A further improvement may be to monitor both signal-to-stationary noise as well as signal-to-non-stationary noise, and then factor these parameters into the calculation of the gain (attenuation) that is applied by the attenuator 46 (see FIG. 1).

As explained above, ΔX may be a good indicator of voice activity, since the desired speech or talker signal component that has been picked up by the first channel is in effect only slightly attenuated in this term, while the noise component which is the difference between the noise picked up by the first channel and the noise picked up by the second channel, namely ΔV, is significantly smaller (e.g., on the order of about 20 dB or more) than either $V_1$ or $V_2$—see equation (1) above.

A second point here is that in one embodiment, $X_1$ which is the signal output by the first channel, may be classified into two distinct states, namely Noise-only and Noise-plus-speech. During the Noise-only state, an improved noise estimate can be obtained directly from the raw power spectrum of the first audio signal from the first channel, that is $X_1$. However, in Noise-plus-speech intervals, the raw power spectrum of $X_2$ may provide a better indication of the noise components on the first channel signal.

Recall that in a conventional 1-channel noise suppressor, the noise estimate is obtained by averaging the power spectrum of the microphone signal during a Noise-Only state, and then freezing the update to the noise estimate as soon as a Noise-Plus-Speech state has been entered. This technique somewhat works well with stationary noise, since the noise estimate computed during a Noise-plus-speech state will be close to the noise estimate that is computed just before speech activity starts. However, with non-stationary noise, it is difficult to distinguish between Noise-only and Noise-plus-speech states, unless the noise or the speech can be predicted from the past.

Figure 4:
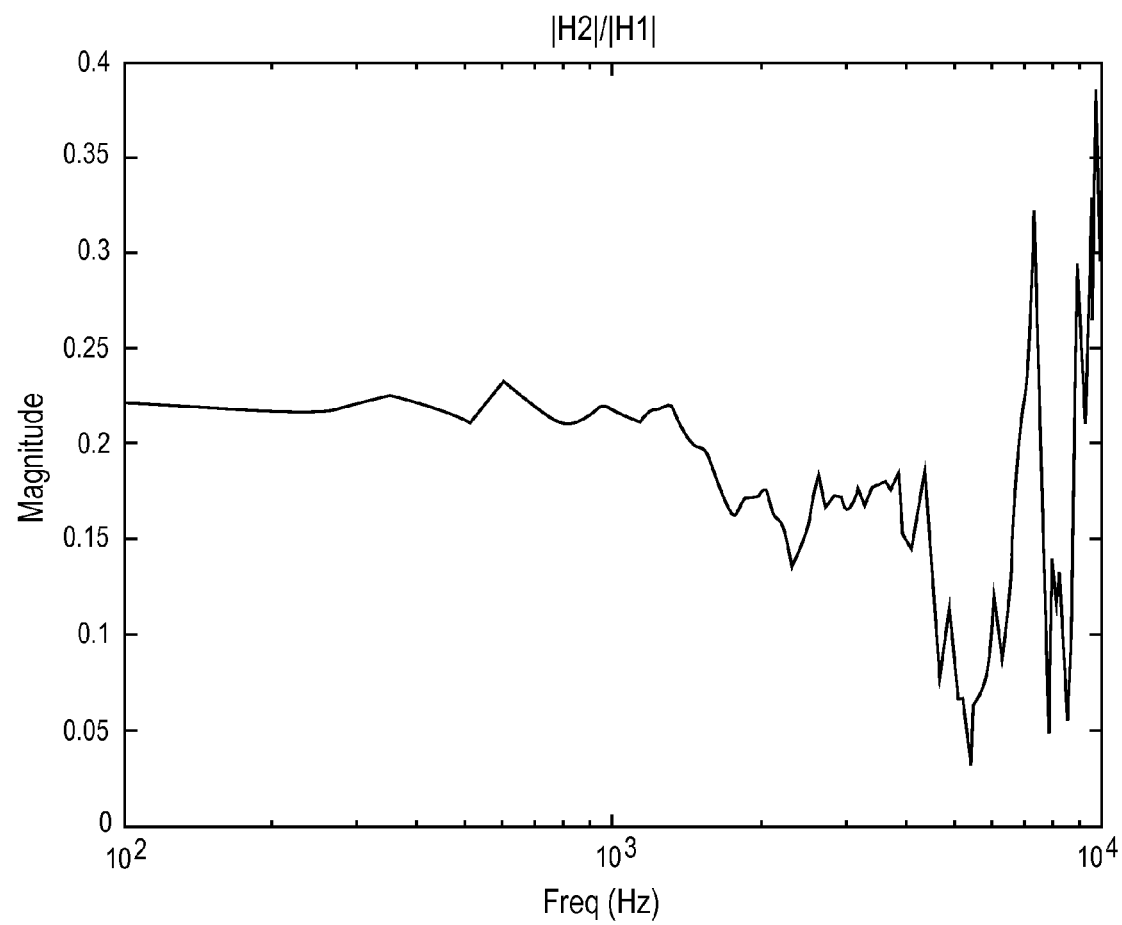
FIG. 4 illustrates a spectrum of the ratio between the transfer functions of an example two-microphone arrangement in a user audio device.

In accordance with another embodiment of the invention, the inventors have recognized that the second channel signal $X_2$ while being composed primarily of noise, may have some speech components. As such, it may not be entirely true that $X_2$ can be used, at all times, as an output noise estimate by itself. In accordance with another embodiment of the invention, the 2-channel noise estimator (estimator 44) uses a different algorithm for its combiner-selector 52 (see FIG. 2), using the derived formula in equation (3) which is as follows $$V_2 \approx X_2 - \Delta X \cdot \left|\frac{H_2}{H_1}\right|^2 \quad (3)$$

where $X_2$ and deltaX are powers, rather than magnitudes in this case. This estimate of the noise picked up by the second channel is implemented in the algorithm below, and may be embodied as the combiner-selector 52 (with the understanding that ΔX may be computed by the VAD 51). The term $\Delta X * [|H_2|/|H_1|]^2$ may be viewed as an estimate of the amount of speech picked up by the second channel. A plot of an experimentally measured magnitude ratio $$\left|\frac{H_2}{H_1}\right|$$

from an example usage scenario is shown in FIG. 4. As seen from this figure, the factor $$\left|\frac{H_2}{H_1}\right|^2$$

may be approximated by a constant value that is selected based on the particular measured transfer function data.

```
% 2-mic noise estimate
% non-vectorized implementation initially
for ii=1:N % loop over all frequency bins
```

```
% First check for voice activity
   if ( Spri(ii) > Ssec(ii)*Threshold )
   % Voice detect
      deltaX = ps_pri(ii) - ps_sec(ii);
      noise_sample = max(ps_sec(ii) - deltaX*factor,st.Smin(ii));
   else
   % Noise detect (Stationary or non-stationary)
      noise_sample = ps_pri(ii);
   end
% Now filter
   noise(ii) = noise(ii)*beta_1 + noise_sample*beta;
end
```

As mentioned above, $[|H_2|/|H_1|]^2$ should be measured under various conditions mentioned, for further validation and adjustment, as the term may be frequency dependent (differs per bin) and specific to the particular user audio device in which the system is implemented. Note that as an alternative to $$\left|\frac{H_2}{H_1}\right|,$$

the scaling factor for ΔX may be the "exact" term developed above (see equation (1) above), namely 1/(MR−1) where MR=$|H_1|/|H_2|$. This term may be derived once for each design of the user audio device, during a training session for example at the factory where a specimen of the user audio device is tested, and then programmed into the noise estimator of each specimen that leaves the factory.

In a further embodiment, a noise floor may be imposed on the estimate in equation (3) above. If there is a stationary component to the noise that can be detected and updated during the Noise-only period by a stationary noise estimator—not shown, then elements of this stationary noise estimate can be used to temper the result in equation (3). For example, the most recent noise estimate by the 1-channel noise estimator (noise estimator 43—see FIG. 1) can be used, referred to here as Smin for each frequency bin, as a reasonable lower bound on the noise estimate computed in equation (3). The algorithm above contains this added feature, as the output noise_sample=max (ps_sec−delta X*factor, st.Smin).

One of the use cases of the user audio device is during a mobile phone call, where one of the microphones, in particular microphone 42, can become occluded, due to the user's finger for example. As a result, the 2-channel noise estimator 44 used in the suppression system of FIG. 1 will provide a very small noise estimate, which may not correspond with the actual background noise level. Therefore, at that point, the system should automatically switch to or rely more strongly on the 1-channel estimator 43 (instead of the 2-channel estimator 44). This may be achieved by adding a microphone occlusion detector 49 whose output generates a microphone occlusion signal that represents a measure of how severely, or how likely it is that, one of the microphones is occluded. The combiner-selector 45 is modified to respond to the occlusion signal by accordingly changing its output noise estimate.

Figure 6:
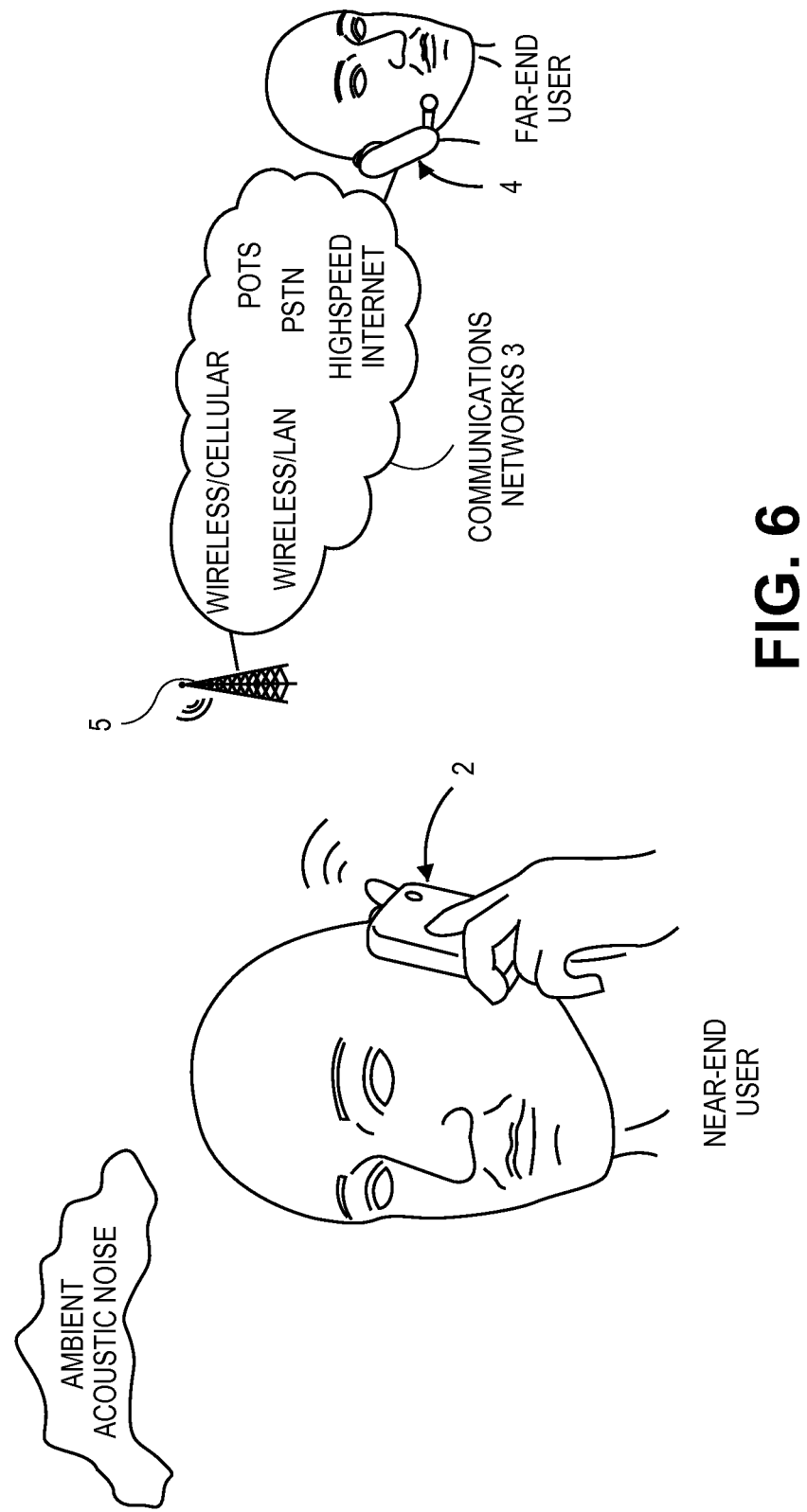
FIG. 6 depicts a mobile communications handset device in use at-the-ear during a call, by a near-end user in the presence of ambient acoustic noise.

FIG. 6 shows a near-end user holding a mobile communications handset device 2 such as a smart phone or a multi-function cellular phone. The noise estimation and noise reduction or suppression techniques described above can be implemented in such a user audio device, to improve the quality of the near-end user's recorded voice. The near-end user is in the process of a call with a far-end user who is using a communications device 4. The terms "call" and "telephony" are used here generically to refer to any two-way real-time or live audio communications session with a far-end user (including a video call which allows simultaneous audio). The term "mobile phone" is used generically here to refer to various types of mobile communications handset devices (e.g., a cellular phone, a portable wireless voice over IP device, and a smart phone). The mobile device 2 communicates with a wireless base station 5 in the initial segment of its communication link. The call, however, may be conducted through multiple segments over one or more communication networks 3, e.g. a wireless cellular network, a wireless local area network, a wide area network such as the Internet, and a public switch telephone network such as the plain old telephone system (POTS). The far-end user need not be using a mobile device, but instead may be using a landline based POTS or Internet telephony station.

Figure 7:
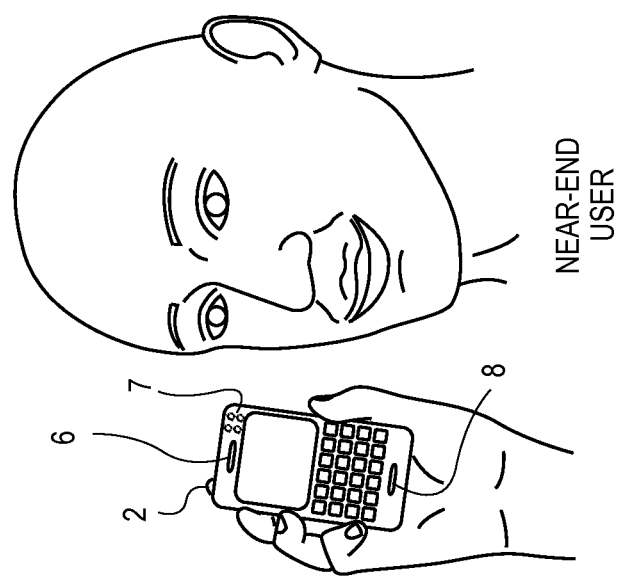
FIG. 7 depicts the user holding the mobile device away-from-the-ear during a call.

As seen in FIG. 7, the mobile device 2 has an exterior housing in which are integrated an earpiece speaker 6 near one side of the housing, and a primary microphone 8 (also referred to as a talker microphone) that is positioned near an opposite side of the housing. The mobile device 2 may also have a secondary microphone 7 located on a side or rear face of the housing and generally aimed in a different direction than the primary microphone 8, so as to better pickup the ambient sounds. The latter may be used by an ambient noise suppressor (see FIG. 8), to reduce the level of ambient acoustic noise that has been picked up inadvertently by the primary microphone 8 and that would otherwise be accompanying the near-end user's speech in the uplink signal that is transmitted to the far-end user.

Figure 8:
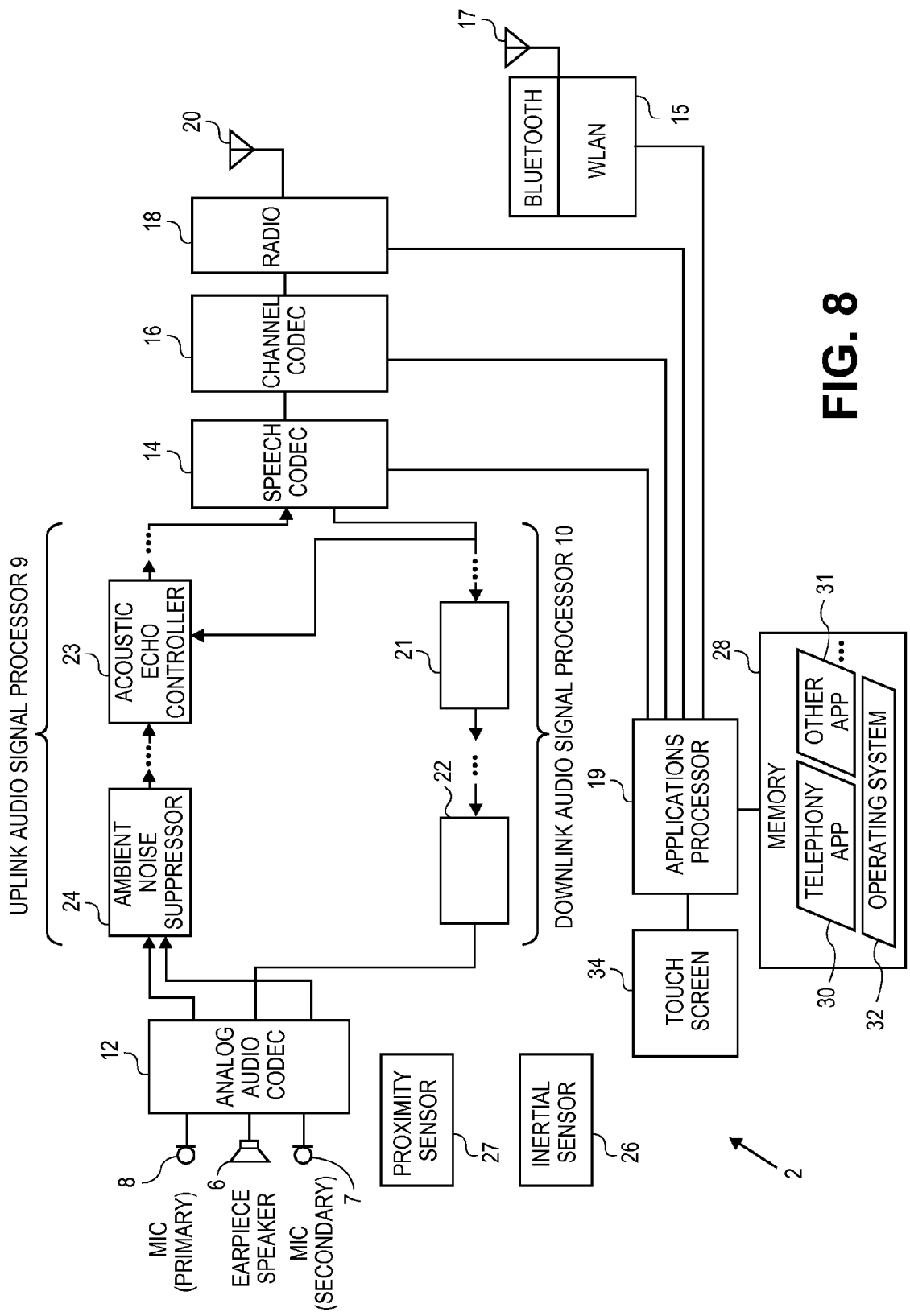
FIG. 8 is a block diagram of some of the functional unit blocks and hardware components in an example mobile device.

Turning now to FIG. 8, a block diagram of some of the functional unit blocks of the mobile device 2, relevant to the call enhancement process described above concerning ambient noise suppression, is shown. These include constituent hardware components such as those, for instance, of an iPhone™ device by Apple Inc. Although not shown, the device 2 has a housing in which the primary mechanism for visual and tactile interaction with its user is a touch sensitive display screen (touch screen 34). As an alternative, a physical keyboard may be provided together with a display-only screen. The housing may be essentially a solid volume, often referred to as a candy bar or chocolate bar type, as in the iPhone™ device. Alternatively, a moveable, multi-piece housing such as a clamshell design or one with a sliding physical keyboard may be provided. The touch screen 34 can display typical user-level functions of visual voicemail, web browser, email, digital camera, various third party applications (or "apps"), as well as telephone features such as a virtual telephone number keypad that receives input from the user via touch gestures.

The user-level functions of the mobile device 2 are implemented under the control of an applications processor 19 or a system on a chip (SoC) processor that is programmed in accordance with instructions (code and data) stored in memory 28 (e.g., microelectronic non-volatile random access memory). The terms "processor" and "memory" are generically used here to refer to any suitable combination of programmable data processing components and data storage that can implement the operations needed for the various functions of the device described here. An operating system 32 may be stored in the memory 28, with several application programs, such as a telephony application 30 as well as other applications 31, each to perform a specific function of the device when the application is being run or executed. The telephony application 30, for instance, when it has been launched, unsuspended or brought to the foreground, enables a near-end user of the device 2 to "dial" a telephone number or address of a communications device 4 of the far-end user (see FIG. 6), to initiate a call, and then to "hang up" the call when finished.

For wireless telephony, several options are available in the device 2 as depicted in FIG. 8. A cellular phone protocol may be implemented using a cellular radio 18 that transmits and receives to and from a base station 5 using an antenna 20 integrated in the device 2. As an alternative, the device 2 offers the capability of conducting a wireless call over a wireless local area network (WLAN) connection, using the Bluetooth/WLAN radio transceiver 15 and its associated antenna 17. The latter combination provides the added convenience of an optional wireless Bluetooth headset link. Packetizing of the uplink signal, and depacketizing of the downlink signal, for a WLAN protocol may be performed by the applications processor 19.

The uplink and downlink signals for a call that is conducted using the cellular radio 18 can be processed by a channel codec 16 and a speech codec 14 as shown. The speech codec 14 performs speech coding and decoding in order to achieve compression of an audio signal, to make more efficient use of the limited bandwidth of typical cellular networks. Examples of speech coding include half-rate (HR), full-rate (FR), enhanced full-rate (EFR), and adaptive multi-rate wideband (AMR-WB). The latter is an example of a wideband speech coding protocol that transmits at a higher bit rate than the others, and allows not just speech but also music to be transmitted at greater fidelity due to its use of a wider audio frequency bandwidth. Channel coding and decoding performed by the channel codec 16 further helps reduce the information rate through the cellular network, as well as increase reliability in the event of errors that may be introduced while the call is passing through the network (e.g., cyclic encoding as used with convolutional encoding, and channel coding as implemented in a code division multiple access, CDMA, protocol). The functions of the speech codec 14 and the channel codec 16 may be implemented in a separate integrated circuit chip, some times referred to as a baseband processor chip. It should be noted that while the speech codec 14 and channel codec 16 are illustrated as separate boxes, with respect to the applications processor 19, one or both of these coding functions may be performed by the applications processor 19 provided that the latter has sufficient performance capability to do so.

The applications processor 19, while running the telephony application program 30, may conduct the call by enabling the transfer of uplink and downlink digital audio signals (also referred to here as voice or speech signals) between itself or the baseband processor on the network side, and any user-selected combination of acoustic transducers on the acoustic side. The downlink signal carries speech of the far-end user during the call, while the uplink signal contains speech of the near-end user that has been picked up by the primary microphone 8. The acoustic transducers include an earpiece speaker 6 (also referred to as a receiver), a loud speaker or speaker phone (not shown), and one or more microphones including the primary microphone 8 that is intended to pick up the near-end user's speech primarily, and a secondary microphone 7 that is primarily intended to pick up the ambient or background sound. The analog-digital conversion interface between these acoustic transducers and the digital downlink and uplink signals is accomplished by an analog audio codec 12. The latter may also provide coding and decoding functions for preparing any data that may need to be transmitted out of the mobile device 2 through a connector (not shown), as well as data that is received into the device 2 through that connector. The latter may be a conventional docking connector that is used to perform a docking function that synchronizes the user's personal data stored in the memory 28 with the user's personal data stored in the memory of an external computing system such as a desktop or laptop computer.

Still referring to FIG. 8, an audio signal processor is provided to perform a number of signal enhancement and noise reduction operations upon the digital audio uplink and downlink signals, to improve the experience of both near-end and far-end users during a call. This processor may be viewed as an uplink processor 9 and a downlink processor 10, although these may be within the same integrated circuit die or package. Again, as an alternative, if the applications processor 19 is sufficiently capable of performing such functions, the uplink and downlink audio signal processors 9, 10 may be implemented by suitably programming the applications processor 19. Various types of audio processing functions may be implemented in the downlink and uplink signal paths of the processors 9, 10.

The downlink signal path receives a downlink digital signal from either the baseband processor (and speech codec 14 in particular) in the case of a cellular network call, or the applications processor 19 in the case of a WLAN/VOIP call. The signal is buffered and is then subjected to various functions, which are also referred to here as a chain or sequence of functions. These functions are implemented by downlink processing blocks or audio signal processors 21, 22 that may include, one or more of the following which operate upon the downlink audio data stream or sequence: a noise suppressor, a voice equalizer, an automatic gain control unit, a compressor or limiter, and a side tone mixer.

The uplink signal path of the audio signal processor 9 passes through a chain of several processors that may include an acoustic echo canceller 23, an automatic gain control block, an equalizer, a compander or expander, and an ambient noise suppressor 24. The latter is to reduce the amount of background or ambient sound that is in the talker signal coming from the primary microphone 8, using, for instance, the ambient sound signal picked up by the secondary microphone 7. Examples of ambient noise suppression algorithms are the spectral subtraction (frequency domain) technique where the frequency spectrum of the audio signal from the primary microphone 8 is analyzed to detect and then suppress what appear to be noise components, and the two microphone algorithm (referring to at least two microphones being used to detect a sound pressure difference between the microphones and infer that such is produced by noise rather than speech of the near-end user). The noise suppression system depicted in FIG. 1 and described above is another example of the noise suppressor 24.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, the 2-channel noise estimator can also be used with multiple microphones whose outputs have been combined into a single signal, in such a way as to separate the talkers voice from the background/ambient noise. This is indicated in FIG. 1, by the additional microphone in dotted lines. The description is thus to be regarded as illustrative instead of limiting.

What is claimed is:

1. A two-channel noise estimator for estimating audio noise using a plurality of microphones, comprising:
   a detector to compare a first audio signal from one of the microphones and a second audio signal from another one of the microphones on a per frequency bin basis and in every frame of a plurality of frames of the first and second audio signals; and
   a selector that is to generate a 2-channel noise estimate, on a per frequency bin basis and for every frame of the plurality of frames, from
   a) the second audio signal and not the first audio signal in a frame, when the first audio signal is larger than the second audio signal in a given frequency bin in the frame as per a threshold, as indicated by the detector, and
   b) the first audio signal and not the second audio signal in a frame, when the first audio signal is smaller than the second audio signal in a given frequency bin in the frame as per a threshold, as indicated by the detector.

2. The two-channel noise estimator of claim 1 wherein the detector is to compare smoothed versions of spectral power or spectral energy of the first and second audio signals, with a threshold.

3. The two-channel noise estimator of claim 1 wherein the selector is to generate the 2-channel noise estimate by smoothing the first or second audio signal, with respect to time and frequency bins.

4. A two-channel noise estimator for estimating audio noise using a plurality of microphones, comprising:
   a voice activity detector (VAD) to compare a first audio signal from one of the microphones and a second audio signal from another one of the microphones on a per frequency bin basis; and
   a selector that is to generate a 2-channel noise estimate being, on a per frequency bin basis,
   a) a measure of the second audio signal from which a scaled difference between the first and second audio signals has been subtracted, when the VAD indicates that a frequency bin is speech, or
   b) a measure of the first audio signal and not the second audio signal, when the VAD indicates that a frequency bin is noise.

5. The two-channel noise estimator of claim 4 wherein the VAD is to compare smoothed spectral power or spectral energy of the first and second audio signals with a threshold.

6. The system of claim 5 wherein the selector is to generate the 2-channel noise estimate by smoothing the measure of the first or second audio signal, with respect to time and frequency bins.

7. The two-channel noise estimator of claim 4 wherein the difference is scaled in accordance with a factor that varies per frequency bin and is approximately 1/(MR−1) where MR is a magnitude ratio of transfer functions of the first and second microphones.

8. The two-channel noise estimator of claim 4 wherein a most recent single-channel noise estimate is used as a lower bound for the 2-channel noise estimate that is generated by the selector, when the selector generates the 2-channel noise estimate from a).

9. The two-channel noise estimator of claim 4 wherein the selector is to generate the 2-channel noise estimate by smoothing the measure of the first or second audio signal, with respect to time and frequency bins.

10. The two channel noise estimator of claim 4 wherein the first audio signal is from a primary microphone, and the second audio signal is from a secondary microphone.

11. The two channel noise estimator of claim 10 in combination with a mobile communications handset housing in which the primary microphone and the secondary microphone are integrated.

12. The two channel noise estimator of claim 4 further comprising:
   a 1-channel noise estimator to process the first audio signal and not the second audio signal, and generate a 1-channel noise estimate;
   a comparator to compare the 1-channel noise estimate and the 2-channel estimate with a threshold; and
   a selector to receive the 1-channel and 2-channel noise estimates, and to generate an output noise estimate using the 1-channel and 2-channel noise estimates, based on the comparison, wherein the selector's output noise estimate is the 2-channel noise estimate but not when the 2-channel estimate is greater than the 1-channel noise estimate by more than a predetermined threshold in which case the output noise estimate is the 1-channel noise estimate.

13. The two channel noise estimator of claim 12 further comprising
   an attenuator to attenuate the first audio signal in accordance with the output noise estimate.

14. The two channel noise estimator of claim 12 wherein each of the 1-channel and 2-channel noise estimates comprises a respective noise estimate vector, wherein the respective vector has a plurality of spectral component noise estimates each for a different audio frequency bin.

15. The two channel noise estimator of claim 1 wherein the first audio signal is from a primary microphone, and the second audio signal is from a secondary microphone.

16. The two channel noise estimator of claim 15 in combination with a mobile communications handset housing in which the primary microphone and the secondary microphone are integrated.

* * * * *